May 28, 1935.　　　W. S. THOMAS　　　2,003,060
THERMOSTATIC CONTROLLING DEVICE
Filed April 2, 1934　　　2 Sheets-Sheet 1
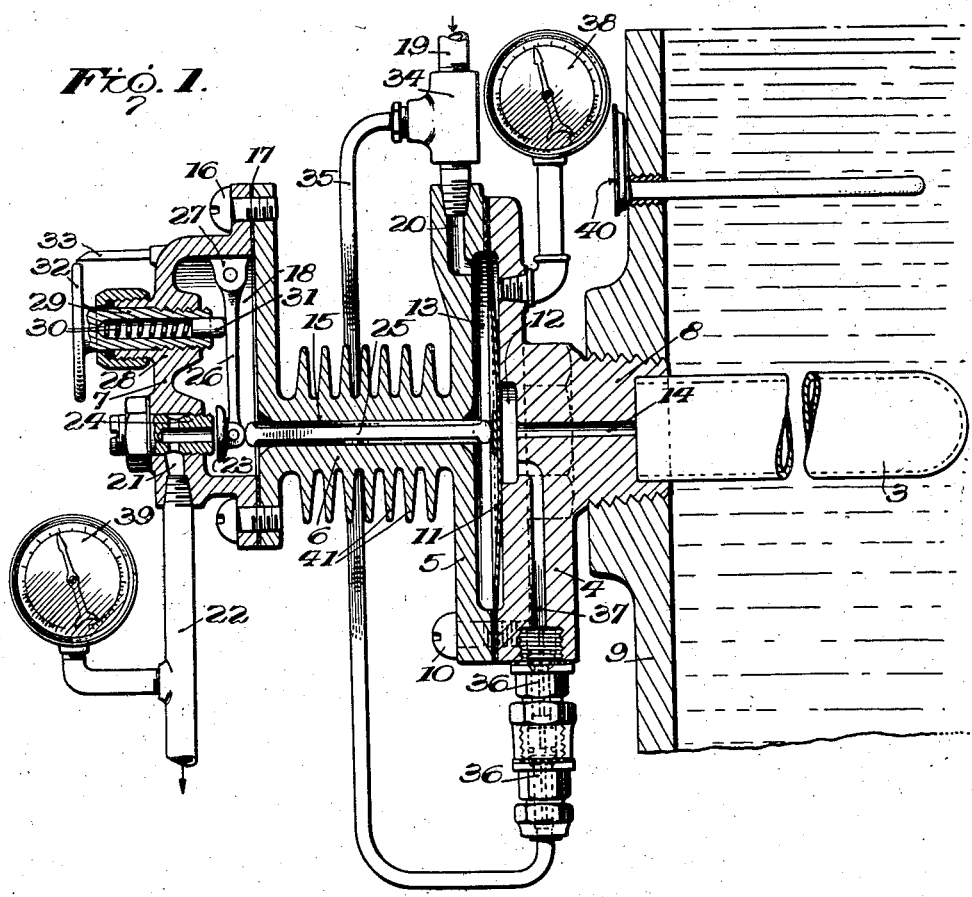
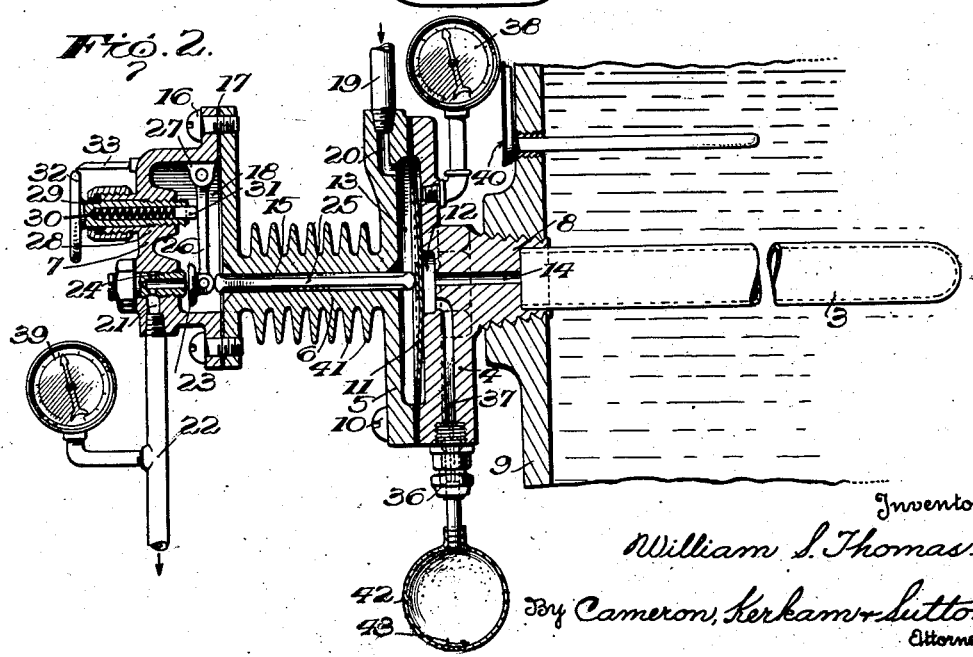
Inventor
William S. Thomas.
By Cameron, Kerkam & Sutton.
Attorneys

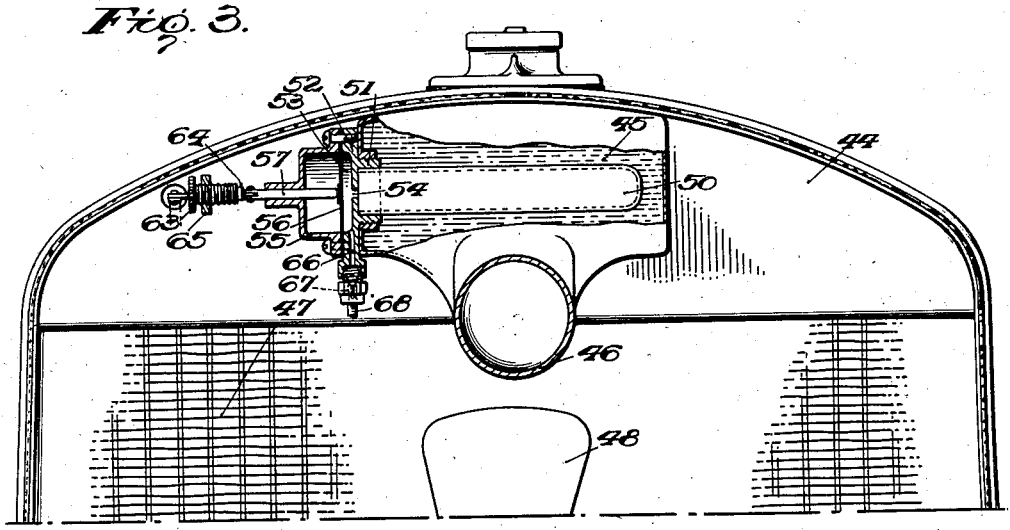
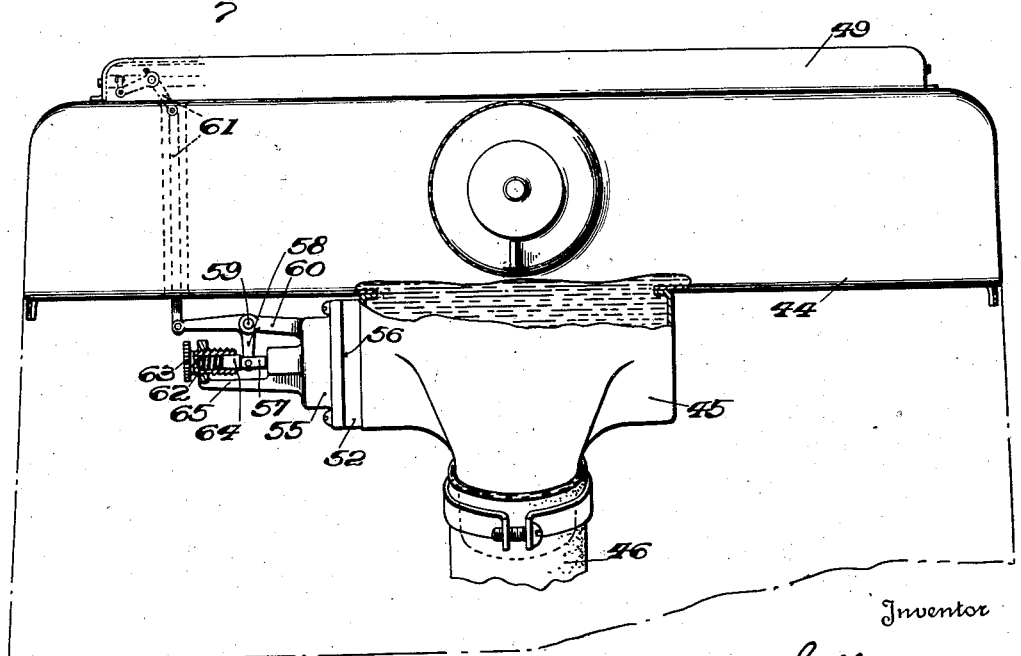

Patented May 28, 1935

2,003,060

UNITED STATES PATENT OFFICE 2,003,060

THERMOSTATIC CONTROLLING DEVICE

William S. Thomas, Montoursville, Pa., assignor of one-half to Ernest L. Heckert, Montoursville, Pa.

Application April 2, 1934, Serial No. 718,711

11 Claims. (Cl. 236—32)

This invention relates to thermostatic controlling devices, and more particularly to thermostats utilizing the variations in pressure of a fluid or gaseous medium in response to changes in temperature for controlling the position of a valve or other element.

One of the objects of the invention is to provide an improved thermostatic controlling device of this general character which is simple in structure, automatic and efficient in operation, and entirely dependable from a safety standpoint over long periods of service.

Another object is to provide a thermostat of novel construction that will be capable of repeated automatic operation during long service upon relatively small differentials in temperature without varying from desired limits of accuracy.

In known thermostats of the gaseous pressure type, wherein a certain quantity of gas is initially placed in the expansion chamber and the chamber is then sealed up, it has been found that after a period of use and repeated increases and decreases in the gas pressure in accordance with temperature variations the pressure of the gas does not reach the same point at any given temperature as it did when the expansion chamber was first filled. This defect in the operation of devices hitherto known and used by the practical art, which may be due either to leakage that cannot be entirely prevented or to some change in the composition of the gas itself, introduces a serious inaccuracy into the functioning of such devices and is the basis of many complaints by users of appliances embodying this type of thermostat.

Although thermostats operated by the expansion and contraction of a metallic medium have been designed and used to eliminate the difficulties with and objections to these gaseous thermostats of the prior art, it has been found that thermostats of the metallic type are not nearly so effective, and do not operate on as close tolerances, as those of the gaseous type. It is obvious that where a solid metal rod is used as an expanding medium, it cannot react as quickly as a gaseous fluid, since the heat units stored in the solid metal require a much greater length of time for their dissipation. For example, where heavy withdrawals of water are made, such as in shower baths, laundry tubs, and in other ways, the temperature drop can be very great before the solid metal expansion medium reacts to a point of functioning. Consequently, there is still a definite need in the art for a gaseous type thermostat which will function efficiently and accurately upon small temperature variations over long periods of time without breakdown.

It is therefore another object of the present invention to provide a novel form of thermostat of the gaseous pressure type which is characterized by the inclusion of means for insuring that the gaseous medium utilized always attains substantially the same pressure each time that the temperature is raised or lowered to any particular point.

A further object is to provide a thermostat of this type with novel means for replenishing the supply of the operating gaseous medium either automatically each time the pressure thereof reaches a predetermined point or manually at the will of the operator.

These and other objects will appear more fully from a consideration of the detailed description of the invention which follows. Although three different embodiments of the invention are described and illustrated in the accompanying drawings, it is to be expressly understood that these drawings are for purposes of illustration only and are not to be construed as defining the scope of the invention, reference being had for the latter purpose to the appended claims.

In the drawings, wherein like reference numerals indicate like parts throughout the several views:

Fig. 1 is a sectional view of a thermostatically operated valve assembly for a gas water heater embodying one form of the present invention wherein the supply of expansible gaseous medium is automatically replenished each time that the pressure thereof falls to a predetermined point;

Fig. 2 is a similar view of a portion of another embodiment of the invention, also adapted for use in connection with a gas water heater, wherein the replenishment of the supply of expansible gaseous medium may be effected manually at the will of the operator; and Figs. 3 and 4 are plan and elevation views, respectively, with certain parts shown in section, of still another embodiment of the invention as applied to the cooling system of an automobile engine.

Referring first to Fig. 1, there is shown therein a thermostatically controlled valve assembly embodying the present invention associated with a gas water heater, the latter being of any desired construction and only so much of the tank thereof being shown in the drawings as is necessary to illustrate the operation of the invention. In the embodiment shown, the thermostat utilizes as its expansible operating medium a quantity of the same fuel gas that is used for heating the water in the heater tank, while the controlling temperature which effects opening and closing of the valve governing the supply of gas to the burner of the heater is that of the water within the heater tank. When used for this purpose, the present invention insures efficient, automatic and dependable operation of the heater, particularly by reason of the fact that the pressure of the gas in the expansion chamber which controls the opening and closing of the valve in the gas supply line always attains the same pressure each time that the temperature of the water in the tank reaches any given temperature. As one important advantage of such a construction, it may be pointed out that by insuring the closure of the valve in the gas supply line every time that the temperature of the water reaches a predetermined point, there is no possibility of overheating the water and consequent scalding of the user should excessively heated water be inadvertently withdrawn from the tank and used, as in a shower bath.

In the form shown, the valve assembly of the present invention comprises generally an expansion or heating chamber 3, a pair of diaphragm encasing members 4 and 5, member 5 preferably being formed integral with an outwardly projecting cooling spacer member 6, and a valve casing member 7. Diaphragm encasing member 4 is preferably provided with an inwardly extending, externally threaded boss 8 which is adapted to be threaded into the side of water heater tank 9, while the inner end of said boss is provided with an enlarged recess in which is sealed in any suitable manner the open end of expansion or heating chamber 3, the latter preferably comprising a tube of relatively large capacity formed of highly heat conductive material, such as hard drawn copper tubing, and projecting well within the interior of water tank 9 so as to be capable of readily absorbing heat from the surrounding water.

Encasing members 4 and 5 are provided with complementary circumferential flanges which are adapted to be secured to one another in any desired manner, as by bolts or screws 10, and between which is clamped the periphery of a sensitive flexible diaphragm 11. It has been found that a diaphragm of German silver approximately five inches in diameter and having a thickness of about four thousandths of an inch is well suited for an installation of the character disclosed. It will be understood that the joint between the flanges of diaphragm encasing members 4 and 5 is made as nearly air and gas-tight as possible by the use of suitable gaskets or other sealing means.

The faces of members 4 and 5 adjacent diaphragm 11 are recessed to provide suitable pressure chambers 12 and 13 on either side of the latter, pressure chamber 12 communicating with the interior of expansion chamber 3 through a suitable passageway 14 extending axially through member 4, while chamber 13 is connected to the valve chamber within valve casing member 7 through another passageway 15 extending axially through cooling spacer member 6. In the embodiment illustrated, pressure chamber 13 is substantially cylindrical in shape, whereas the central portion of chamber 12 is more deeply recessed than the outer portion. With this construction, movement or flexing of the diaphragm to the right from its normal position (shown in broken lines) will cause a flattening of the outer portion of the periphery of said diaphragm against the wall of pressure chamber 12, as shown in Fig. 1, and thereby decrease the effective area of the diaphragm that is exposed to the fluid pressure within said chamber and expansion chamber 3. This construction is particularly useful in installations where it is desired that the gas valve be of the snap acting type, although it will be understood that the invention in its other aspects is equally useful with valves of the throttling type.

The outer end of cooling spacer member 6 is also provided with an enlarged flange to which valve casing member 7 is secured, as by screws 16, the joint between said members being rendered as nearly air and gas-tight as possible by the use of a suitable gasket 17. The space enclosed between members 6 and 7 comprises a valve chamber 18 which is adapted to house a suitable valve for controlling the flow of gas to the burner of the water heater. In the embodiment shown, fuel gas may be supplied at ordinary line pressure through a pipe 19 and inlet 20 to pressure chamber 13, the gas then passing from chamber 13 through passageway 15 to valve chamber 18 whence it leaves through a suitable outlet 21 and is conducted by a pipe 22 to the burner of the water heater. The passage of the gas from valve chamber 18 to outlet 21 is controlled by a valve 23 of any desired construction having an adjustable valve seat 24 which is threaded into the wall of casing member 7 and is provided with suitable passageways communicating with both valve chamber 18 and outlet 21. By providing a threaded engagement between valve seat 24 and casing 7, the point at which valve 23 opens and closes communication between valve chamber 18 and outlet 21 may be accurately adjusted.

The movements of valve 23 are adapted to conform to the movements of flexible diaphragm 11, the position of the latter in turn depending upon the variations in pressure exerted thereagainst, as will be later described. In order to provide an operative connection between diaphragm 11 and valve 23, the valve assembly illustrated includes a valve actuating rod 25 which extends through passageway 15 and engages at its opposite ends the center of diaphragm 11 and the back of valve 23. If desired, rod 25 may be secured to diaphragm 11 in any suitable manner. Valve actuating rod 25 is preferably of a different cross section than passageway 15 so that the spaces between the outer surface of the rod and the inner wall of the passageway may act as a restricted passageway through which gas may pass from pressure chamber 13 to valve chamber 18. For example, if passageway 15 is circular in cross section it has been found that a triangular valve actuating rod 25 is well suited for the purposes of the present invention.

Valve 23 may be supported in its proper position adjacent valve seat 24, and in position to be engaged by one end of actuating rod 25, by a suitable lever 26, one end of which is secured to the back of valve 23 and the other end suitably fulcrumed in a forked lug 27 projecting inwardly from the wall of casing member 7. In order that valve 23 shall follow the movements of diaphragm 11 in both directions, and also for the purpose of accurately adjusting the valve mechanism so that it will open and close under predetermined conditions, means are also provided for yieldingly urging valve 23 to the right, as viewed in Fig. 1. As shown, casing member 7 is provided with a boss 28, the inner end of which is internally threaded to receive an axially recessed adjusting member 29. Within the recess of said member 29 is housed a suitable spring 30, the inner end of which exerts a pressure against a plunger 31 slidably mounted in the inner end of member 29 and engaging valve lever 26 at such a point as to tend to move valve 23 to the right, as viewed in Fig. 1. The outer end of adjusting member 29 is provided with an enlarged circular adjusting head or handle 32 which is preferably calibrated in terms of the water temperature which it is desired to maintain within tank 9, the setting at any particular position being indicated by an index member 33 carried by casing member 7.

With the construction thus far described, it will be obvious that the positions of diaphragm 11 and valve 23 will depend upon the fluid pressure in pressure chamber 12, the gas pressure in pressure chamber 13 and valve chamber 18, and the adjustable pressure exerted by spring 30, the pressure in pressure chamber 12 in turn being dependent upon the quantity and character of the fluid medium within expansion chamber 3 and the temperature of the water in the tank surrounding said chamber. In devices of this general character hitherto known to the art, it has been customary to place a quantity of expansible fluid medium in expansion chamber 3 when the device is initially installed and to rely upon the efficiency of the sealing of the various elements to one another to prevent escape of said medium. However, it has been found that, either because of leakage which cannot be entirely prevented or because of some unknown change in the composition of the fluid medium itself, such devices cannot be depended upon to always operate at the same water temperatures after any substantial period of service.

Means have therefore been provided by the present invention for insuring continued, automatic, accurate operation of the thermostatic device, which means are characterized by an automatic replenishment of the supply of expansible fluid medium each time that the pressure of that medium reaches a predetermined point. In the particular embodiment illustrated, the expansible fluid medium utilized in expansion chamber 3 and pressure chamber 12 is the same gas as that which is supplied to the burner of the water heater, and means have been provided for replenishing the supply of said gas within pressure chamber 12 and expansion chamber 3 each time that the pressure therewithin falls to a point just below the pressure of the gas in supply pipe 19.

As shown, pipe 19 is provided with a suitable T connection 34 which receives one end of a by-pass conduit or pipe 35, the other end of which is connected to pressure chamber 12 through a pair of check valves 36 arranged in series and a passageway 37 formed in the wall of encasing member 4. Check valves 36 are preferably of relatively light construction and, in order to insure their operation upon small differentials in pressure, may be mounted with their axes horizontal, instead of vertical as shown, so as to eliminate as far as possible the gravitational effect of the valves themselves.

For calibration and checking purposes, pressure chamber 12 may be provided with a suitable pressure gauge 38, while a similar gauge 39 may be connected to gas pipe 22. A thermometer 40 of any suitable construction may also be provided for indicating the temperature of the water within tank 9.

In order to prevent any undue increase in the pressure of the gas in valve chamber 18 due to the conduction of heat from the water in tank 9 through the metallic walls of members 3, 4, 5, 6 and 7, which increase in pressure would be exerted upon the back of valve 23 and oppose its opening, spacer member 6 may be provided with a plurality of cooling fins 41.

In operation, the thermostatic controlling device of the present invention functions as follows: Assuming that the water in tank 9 is cold, as for example at a temperature of 40° as indicated on thermometer 40, the pressure of the gas within expansion chamber 3 and pressure chamber 12 will be relatively low and the line pressure of the gas in pressure chamber 13 and valve chamber 18 plus the pressure of spring 30 exerted against lever 26 will be more than sufficient to force diaphragm 11 to the right, as viewed in Fig. 1, and to open valve 23, thereby permitting gas to pass from supply pipe 19 through pressure chamber 13, restricted passageway 15 and valve chamber 18 to outlet pipe 22 whereby it is carried to the burner of the water heater. At the same time, since the gas pressure within pressure chamber 12 is less than the line pressure which exists in supply pipe 19 and chambers 13 and 18, check valves 36 are open so that communication is established between supply pipe 19 and pressure chamber 12 through by-pass conduit 35, thereby enabling expansion chamber 3 and pressure chamber 12 to receive a fresh supply of gas at line pressure.

As the heat units produced by combustion of the gas at the burner are transferred to the water within tank 9, the temperature of the latter gradually increases and heat is rapidly transferred therefrom through the highly heat conductive walls of the expansion chamber 3 to the gas therewithin. As soon as the temperature of the gas within expansion chamber 3 and pressure chamber 12 has been increased to the point where the gaseous pressure becomes slightly greater than the line pressure of the gas in supply pipe 19, check valves 36 are closed. Continued heating of the water in tank 9 progressively increases the gaseous pressure within expansion chamber 3 and pressure chamber 12, and that pressure is exerted against diaphragm 11 in opposition to the gas pressure in chambers 13 and 18 and the pressure of spring 30. When the temperature of the water in the tank reaches the predetermined point at which the device has been calibrated, the gas pressure within chamber 12 becomes greater than the sum of the gas pressure in chambers 13 and 18 and the pressure of spring 30, moves diaphragm 11 to the left, and, through valve actuating rod 25, closes valve 23, thereby cutting off the supply of gas to the burner of the water heater. If it be assumed that the water temperature at which valve 23 is closed is 140°, regulating handle 32 will be so calibrated that, with a setting of spring 30 such as to permit closure of valve 23 just when the temperature indicated by thermometer 40 reaches 140°, index 33 will correspond with a reading of 140° on handle 32.

When using a pressure chamber 12 of the construction shown in Fig. 1, highly efficient snap action in the closing of valve 23 is obtained since, as soon as the pressure in chamber 12 becomes sufficiently high to start movement of diaphragm 11 to the left and out of contact with the outer portion of the wall of said chamber, the area of the diaphragm exposed to the pressure of the expansible gas is suddenly materially increased and the total pressure acting to close the valve becomes relatively much greater than the opposing pressure. The result is that valve 23 is quickly and forcibly moved to closed position.

As the water within tank 9 cools, or when some of the hot water is withdrawn and replaced by cold water, the temperature and pressure of the gas within expansion chamber 3 and pressure chamber 12 also decrease. When this gaseous pressure drops to the point where it is less than the combined pressure of the gas in chambers 13 and 18 and the pressure exerted by spring 30, the diaphragm 11 is again moved to the right so as to permit valve 23 to open and again establish a flow of gas to the burner of the heater. Snap action is also obtained upon opening of valve 23 in the following manner: When valve 23 is first cracked, there is a sudden rush of gas from valve chamber 18 into pipe 22 down to the burner. Although this results in a momentary drop in pressure in valve chamber 18, the throttling effect of the burner and the elasticity of the gas in pipe 22 causes a back pressure to be quickly built up in valve chamber 18 and pressure chamber 13, which back pressure is exerted against diaphragm 11 and forces it to the right with a snap. With the form of device illustrated, it will be possible to so calibrate the device that a decrease of as little as from 5° to 10° in temperature of the water within tank 9 below the temperature set on hand wheel 32 will be effective to cause an opening of valve 23.

Every time that the temperature of the water drops to such a point that the pressure of the gas within expansion chamber 3 and pressure chamber 12 falls slightly below the line pressure in pipe 19 and chambers 13 and 18, check valves 36 open and permit replenishment of the supply of gas within chambers 12 and 3. Because of this provision for automatic replenishment of the expansible gas which forms the actuating medium of the thermostatic device, its operation is always based upon a relatively fresh supply of gas at a known basic pressure with the result that the gaseous pressure within chambers 3 and 12 always reaches the same point every time that the water within tank 9 reaches any given temperature, regardless of the length of time that the device has been in service.

The embodiment of the invention illustrated in Fig. 2 of the drawings is similar in construction to that of Fig. 1 with the exception that the by-pass connection between gas supply pipe 19 and pressure chamber 12 is omitted and suitable means are substituted therefor whereby the supply of gaseous medium within expansion chamber 3 and pressure chamber 12 may be replenished manually. As shown, it is assumed that the gaseous medium utilized in expansion chamber 3 and pressure chamber 12 is air, the supply of which may be replenished at the will of the operator by a pump of any desired construction, such as a rubber bulb 42 having an inlet valve 43 and being connected with pressure chamber 12 through a check valve 36 and passageway 37. With this construction, whenever the pressure indicated on gauge 38 varies from a predetermined relationship with the temperature indicated by thermometer 40, a relationship which may be computed and supplied to the user of the device in the form of a table, additional air may be pumped into chamber 12 by bulb 42 until the pressure indicated on gauge 38 is increased to the proper point as compared with the temperature of the water in the tank as indicated by thermometer 40.

Referring now to Figs. 3 and 4, there is disclosed therein a portion of the cooling system of an automobile engine which embodies a thermostatic device constructed in accordance with the present invention for controlling the position of the radiator shutters, which position in turn governs the cooling effect of the radiator upon the water flowing therethrough. As shown, the upper portion of the automobile radiator 44 is provided with a suitable rearwardly extending tank 45 to which is connected the hose 46 leading from the cooling jackets surrounding the engine cylinders and into which the warm water leaving the engine block is delivered. From tank 45, the warm water passes into the tubes of the radiator honeycomb 47 and, during its passage downwardly therethrough, is cooled by the air that is drawn through the honeycomb by a fan 48 in the usual manner. In order to control the degree of cooling thus attained, the front of the radiator is provided with a well known arrangement of adjustable shutters indicated generally at 49.

It has been customary to regulate the position of the radiator shutters either manually from the driver's position or automatically by means of thermostatic devices well known to the art, but in no prior system of which applicant is aware have these shutter control devices proven sufficiently accurate and reliable to be entirely satisfactory during continued use over long periods of service. However, by the use of the thermostatic controlling device of the present invention, the radiator shutters may be continuously and accurately adjusted to such positions that the temperature of the water within the cooling system may always be maintained at or below a desired temperature.

In the construction illustrated, an expansion tube or chamber 50, closed at one end and having walls of relatively highly heat conductive material, is mounted within tank 45 in any suitable manner in such position as to be surrounded by the water of the cooling system as it is delivered from the engine block through hose connection 46. For example, the open end of chamber 50 may be suitably secured in a recess formed in the boss 51 of a casing member 52 and the latter secured to tank 45 in any desired manner, as by threaded engagement between boss 51 and the wall of said tank, as shown. The outer face of member 52 is recessed to provide a pressure chamber 53 which communicates with the interior of expansion chamber 50 through a suitable passageway 54. Clamped between a flange formed on member 52 and a similar flange formed on a complementary casing member 55 is the periphery of a flexible diaphragm 56, one side of which forms a movable end wall for pressure chamber 53 and expansion chamber 50, while the other side is engaged by or has secured thereto one end of a push rod 57, the other end of which extends outwardly of casing member 55 and is connected to one arm of a suitable lever 58 fulcrumed as at 59 in a lug 60 projecting from casing member 55. The other arm of lever 58 is connected through any suitable mechanism, such as the link and lever arrangement indicated generally at 61, to the radiator shutters 49.

The interiors of expansion chamber 50 and pressure chamber 53 are filled with an expansible fluid medium of any preferred character, the pressure of which is exerted against diaphragm 56 and tends to move rod 57 to the left, as viewed in the drawings, the connections between said rod and the radiator shutters 49 being such that said movement to the left increases the opening of said shutters, thereby increasing the cooling effect of the radiator. Since the walls of expansion chamber 50 are of highly heat conductive material, and since the volume of said chamber is relatively large, variations in the temperature of the water in tank 45 are quickly manifested by changes in the pressure of the fluid medium in said expansion chamber and pressure chamber 53, which variations in pressure in turn vary the positions of diaphragm 56, rod 57 and shutters 49. In order to move rod 57 and diaphragm 56 to the right and close shutters 49 when the fluid pressure within chambers 50 and 53 falls, and in order to provide an accurate adjustment for the device, the outer end of rod 57 may thrust against the pressure of a suitable spring 62 housed within a recess formed in adjusting member 63, the free end of said spring being seated against a plunger 64 which in turn abuts the end of rod 57. Adjusting member 63 is externally threaded into a bracket 65 which may conveniently be carried by or formed integrally with casing member 55, the threaded engagement between member 63 and bracket 65 providing a ready adjustment for the pressure of spring 62 and for calibration of the thermostatic device.

In order that the fluid within chambers 50 and 53 may always attain the same pressure (and thereby open the shutters 49 the same amount) each time that the temperature of the water in tank 45 reaches any given value, regardless of the length of time that the device has been in service, suitable means are provided for automatically replenishing the supply of fluid medium within said chambers at certain intervals. In the embodiment illustrated, assuming that atmospheric air is utilized as the expansible fluid medium, means are provided for automatically opening chambers 50 and 53 to the atmosphere each time that the pressure therewithin falls to or slightly below atmospheric, thereby insuring continued accurate operation of the device. As shown, this improved result is attained by the simple expedient of connecting chamber 53 to the atmosphere through a restricted passageway 66 formed in member 52 and a suitable check valve 67 of sensitive construction, the inlet nipple 68 of the latter being open to the atmosphere. With this construction, each time that the pressure of the air within chambers 50 and 53 drops to or slightly below atmospheric pressure, check valve 67 will open and the supply of air within said chambers may be replenished from the atmosphere.

It is believed that the operation of the device illustrated in Figs. 3 and 4 is apparent from the preceding description of its construction and from the previous discussion of the devices of Figs. 1 and 2. It will also be readily appreciated that the controlling device of Figs. 3 and 4 is equally well adaptable for uses other than operating the radiator shutters, as disclosed, as for example opening and closing a valve in the line through which the cooling water is led back to the engine block from the radiator.

There is thus provided by the present invention a simply constructed thermostatic controlling device of novel character that is capable of efficient, automatic operation during long service without deviating from desired limits of accuracy. The device is particularly adaptable for use as the controlling unit of a gas water heater or an automobile radiator installation, since the novel construction provided insures accurate and safe operation regardless of the length of time that the device has been in service, this particular aspect of the invention being characterized by the feature of automatic or manual replenishment of the supply of expansible fluid medium whenever such replenishment becomes necessary.

Although three different embodiments of the invention are shown in the drawings, it is obvious that the invention is not limited to these particular structures but is capable of a variety of mechanical embodiments. For example, although in the embodiment of Fig. 1 the expansible fluid medium used is the same gas that is supplied to the burner of the water heater, it will be apparent that any other suitable fluid medium may be utilized and that pipe 35 may be connected to any suitable source of such medium instead of to the gas supply pipe, as shown. Likewise, if it is desired to use air as the expansible actuating medium in the embodiment of Fig. 1, it is obvious that the desired results would be obtained simply by leaving pipe 35 open to the atmosphere, as is shown in Fig. 3. Similarly, the well known bulb pumping arrangement of Fig. 2 may be replaced by any other suitable means for performing the same function, and may utilize any desired fluid medium instead of air, as shown, while the embodiment of Figs. 3 and 4 may secure replenishing fluid from any suitable source other than the atmosphere, such as a reservoir of ether or other expansible medium connected to nipple 68 of check valve 67.

It will also be clear to those skilled in the art that by placing the valve assembly of Figs. 1 and 2 in proper relation to the diaphragm, the cycle of operation can be reversed so that the expansion of fluid medium within the expansion chamber will open a valve instead of closing it, thereby rendering the device capable of use as a pilot-actuated control for the main gas valve of a water heater. It is also obvious that, if desired, spacer member 6 of Figs. 1 and 2 may be omitted and valve casing member 7 made integral with member 5, in which case valve chamber 18 and pressure chamber 13 will be combined into a single chamber. On the other hand, the gas supply pipe 19 may be led directly into valve chamber 18, with no connection to the space designated as pressure chamber 13, in which event the diaphragm would be subjected to fluid pressure on one side only, said pressure being opposed solely by the pressure of the spring, as in the embodiment of Figs. 3—4. Furthermore, it is to be distinctly understood that the invention is not limited to use in connection with a gas water heater or an automobile engine cooling system, but may be utilized wherever a highly sensitive, accurate thermostatic controlling device is desired. For example, instead of controlling the opening and closing of a valve or a radiator shutter, the movements of the flexible diaphragm are equally well adapted for opening and closing an electric circuit of any desired character.

Various other changes, which will now occur to those skilled in the art, may be made in the form, details of construction and arrangement of the parts without departing from the spirit of the invention. Reference is therefore to be had to the appended claims for a definition of the scope of the invention.

What is claimed is:—

1. In a thermostatic controlling device, a movable diaphragm operatively connected to the element to be controlled, an expansion chamber communicating with one side of said diaphragm and adapted to be heated by a medium the temperature of which varies in accordance with the position of the element being controlled, said expansion chamber containing a quantity of expansible fluid medium the pressure of which varies with changes in the temperature of the medium by which the chamber is heated and tends to move said diaphragm in one direction, means for opposing the pressure of said fluid medium against said diaphragm and tending to move the latter in the opposite direction, and means for automatically establishing communication between said expansion chamber and a source of said fluid medium each time that the pressure of said medium within said chamber reaches a predetermined point.

2. In a thermostatic controlling device, a movable diaphragm operatively connected to the element to be controlled, an expansion chamber communicating with one side of said diaphragm and containing a quantity of expansible fluid medium the pressure of which tends to move said diaphragm and controlled element in one direction, means for opposing the pressure of said fluid medium against said diaphragm and tending to move the latter and said element in the opposite direction, and means for automatically replenishing the supply of fluid medium in said expansion chamber whenever the pressure of said medium drops to a predetermined point.

3. In a thermostatically operated valve assembly, an expansion chamber having a quantity of expansible fluid therein, a movable diaphragm closing one end of said chamber, a valve, means operatively connecting said diaphragm and valve for moving the latter in response to changes in the pressure of the fluid in said expansion chamber, means for moving the diaphragm and valve in a direction opposite to that in which said elements are moved by the pressure of the fluid in said expansion chamber, and means for automatically establishing communication between the interior of said expansion chamber and a source of said expansible fluid whenever the fluid pressure within the expansion chamber reaches a predetermined point.

4. In a thermostatically operated valve assembly for a gas water heater, an expansion chamber exposed to the temperature of the water in the heater and containing a supply of expansible fluid medium, a movable diaphragm closing one end of said expansion chamber, a valve chamber, a gas inlet to and a gas outlet from said valve chamber, a valve controling the passage of gas from said inlet to said outlet, means operatively connecting said diaphragm and valve for moving the latter in response to changes in the pressure of the fluid medium in said expansion chamber, means for moving the diaphragm and valve in a direction opposite to that in which said elements are moved by the pressure of the fluid in said expansion chamber, and means for automatically establishing communication between the interior of said expansion chamber and a source of said expansible fluid whenever the fluid pressure within the expansion chamber reaches a predetermined point.

5. In a thermostatically operated valve assembly for a gas water heater, an expansion chamber exposed to the temperature of the water in the heater and containing a supply of gas, a movable diaphragm closing one end of said expansion chamber, a valve chamber, a gas inlet to and a gas outlet from said valve chamber, a valve controlling the passage of gas from said inlet to said outlet, means operatively connecting said diaphragm and valve for moving the latter in response to changes in the pressure of the gas in said expansion chamber, means for moving the diaphragm and valve in a direction opposite to that in which said elements are moved by the pressure of the gas in said expansion chamber, and means for automatically establishing communication between the interior of said expansion chamber and a source of the gas supplied to said valve chamber whenever the gaseous pressure within the former reaches a predetermined point.

6. In a thermostatically operated valve assembly for a gas water heater, an expansion chamber exposed to the temperature of the water in the heater and containing a supply of gas, a movable diaphragm closing one end of said expansion chamber, a valve chamber, a gas inlet to and a gas outlet from said valve chamber, a valve controlling the passage of gas from said inlet to said outlet, means operatively connecting said diaphragm and valve for moving the latter in response to changes in the pressure of the gas in said expansion chamber, means including the pressure of the gas in said gas inlet for moving the diaphragm and said valve in a direction opposite to that in which said elements are moved by the pressure of the gas in said expansion chamber, a conduit connecting said gas inlet with said expansion chamber, and a check valve in said conduit for automatically establishing communication between said expansion chamber and said gas inlet whenever the pressure of the gas in said expansion chamber falls to a predetermined point.

7. A thermostatically operated valve assembly comprising an expansion chamber having a wall of highly heat conductive material and adapted to contain a quantity of expansible fluid, a flexible diaphragm closing the end of said expansion chamber, a valve chamber communicating with the opposite side of said diaphragm through an elongated, relatively restricted passageway, a fluid inlet to and a fluid outlet from said valve chamber, a valve controlling the passage of fluid from said inlet to said outlet, means operatively connecting said diaphragm and valve whereby the latter may be moved in one direction by the pressure of the expansible fluid in said expansion chamber, means including the pressure of the fluid supplied to said valve chamber for moving the diaphragm and valve in the opposite direction, and means for cooling the material surrounding said restricted passageway, thereby preventing any increase in pressure of the fluid in said valve chamber due to conduction of heat from said expansion chamber.

8. A thermostatically operated valve assembly comprising a flexible diaphragm clamped at its periphery between a pair of encasing members, each of said members being recessed at its face adjacent said diaphragm to provide pressure chambers on opposite sides of the latter, an expansion chamber communicating with one of said pressure chambers and adapted to contain a quantity of expansible fluid, a valve chamber communicating with the other of said pressure chambers, a fluid inlet to and a fluid outlet from said valve chamber, a valve controlling communication between said fluid inlet and outlet, means operatively connecting said valve and diaphragm for movement together in one direction in response to the fluid pressure in the pressure chamber communicating with said expansion chamber, adjustable spring means for urging said valve and diaphragm in the opposite direction, and means for automatically establishing communication between said two pressure chambers whenever the fluid pressures therein become substantially equal.

9. A thermostatically operated valve assembly comprising a flexible diaphragm clamped at its periphery between a pair of encasing members, each of said members being recessed at its face adjacent said diaphragm to provide pressure chambers on opposite sides of the latter, an expansion chamber communicating with one of said pressure chambers and adapted to contain a quantity of expansible fluid, a valve chamber communicating with the other of said pressure chambers through an elongated, restricted passageway, a fluid inlet to said last named pressure chamber, a fluid outlet from said valve chamber, a valve controlling communication between said fluid inlet and outlet, means operatively connecting said valve and diaphragm for movement together in one direction in response to the fluid pressure in the pressure chamber communicating with said expansion chamber, means including the pressure of the fluid in the pressure chamber communicating with said valve chamber for urging said valve and diaphragm in the opposite direction, means for cooling the material surrounding said restricted passageway to prevent the transmission of heat from said expansion chamber through said encasing members to the fluid in said valve chamber, and means for automatically establishing communication between said two pressure chambers whenever the fluid pressures therein become substantially equal.

10. In a cooling system including a radiator and means governing the cooling effect of said radiator, the combination of an expansion chamber having a wall of highly heat conductive material exposed to the temperature of the medium to be cooled in said radiator, said expansion chamber containing a quantity of expansible fluid, a flexible diaphragm closing one end of said expansion chamber, means operatively connecting said diaphragm and said governing means for movement together in one direction in response to the fluid pressure in said expansion chamber, means for urging said diaphragm and governing means in the opposite direction, and means for automatically replenishing the supply of expansible fluid within said expansion chamber whenever the fluid pressure therewithin reaches a predetermined point.

11. In a cooling system including a radiator and means governing the cooling effect of said radiator, the combination of an expansion chamber having a wall of highly heat conductive material exposed to the temperature of the medium to be cooled in said radiator, said expansion chamber containing a quantity of air, a flexible diaphragm closing one end of said expansion chamber, means for operatively connecting said diaphragm and said governing means for movement together in one direction in response to the pressure of the air in said expansion chamber, means for urging said diaphragm and governing means in the opposite direction, and a check valve connecting said expansion chamber with the atmosphere for replenishing the supply of air therewithin whenever the pressure thereof is reduced below atmospheric.

WILLIAM S. THOMAS.